United States Patent [19]

Reed

[11] Patent Number: 4,596,012

[45] Date of Patent: Jun. 17, 1986

[54] MASTER CONTROLLER SUCCESSION SYSTEM FOR BUS CONTROL ACCESS FOR DATA-COMMUNICATIONS LOCAL AREA NETWORKS

[76] Inventor: Lockwood W. Reed, Holland Rd., Middletown, N.J. 07748

[21] Appl. No.: 497,957

[22] Filed: May 25, 1983

[51] Int. Cl.⁴ .............................................. H04J 3/02
[52] U.S. Cl. ......................................... 370/85; 370/16
[58] Field of Search ..................... 370/94, 60, 16, 85, 370/86; 340/825.5

[56] References Cited

U.S. PATENT DOCUMENTS

| | | | |
|---|---|---|---|
| 4,177,450 | 12/1979 | Sarrand | 340/825.5 |
| 4,328,586 | 5/1982 | Hansen | 370/85 |
| 4,347,602 | 8/1982 | Kister et al. | 370/16 |
| 4,349,856 | 9/1982 | West et al. | 340/825.5 |
| 4,406,007 | 9/1983 | Kister et al. | 370/85 |
| 4,432,054 | 2/1984 | Okada et al. | 340/825.5 |
| 4,434,421 | 2/1984 | Baker et al. | 370/85 |
| 4,466,096 | 8/1984 | Heins et al. | 370/85 |

Primary Examiner—Douglas W. Olms
Assistant Examiner—Curtis Kuntz
Attorney, Agent, or Firm—Anthony T. Lane; Jeremiah G. Murray; Maurice W. Ryan

[57] ABSTRACT

An apparatus and a method which permits a plurality of master stations to be attached to a communications channel and to provide an arbitrating mechanism within each master by which one master station is designated as in control of the communications channel. The method overcomes the single point failure of the true master slave station by providing redundant masters. Furthermore, each station in the network is polled by a grant transmission at a constant interval of time irrespective of which master is in control of the bus to assure efficient utilization of the bus.

9 Claims, 8 Drawing Figures

MASTER CONTROLLER SUCCESSION SYSTEM FOR BUS CONTROL ACCESS FOR DATA-COMMUNICATIONS LOCAL AREA NETWORKS

The invention described herein may be manufactured, used, and licensed by or for the Government for Governmental purposes without the payment to me of any royalties thereon.

BACKGROUND OF THE INVENTION

1. Field of the Invention

This invention relates to the fields of electronics, communications systems and computer systems and more specifically to the new field of local area networks for the passing of data-communications. Specifically this invention relates to an improvement of a technique which controls the exchange of information over a common information channel.

2. Description of the Prior Art

As is well known and understood, because data-communications local area networks are an emerging technology, there are competing systems-design methods using different topology, access, media and protocol schemes. Once the topology of the network—bus or ring—has been decided, one has to consider the procedures for how the network's nodes are to contend equitably for network access. Currently, two dominant network access schemes have proved useable: carrier-sense multiple access with collision detection (CSMA/CD) and collision avoidance or without it (CSMA) and token passing. Both of these schemes do not use a central controller to control access to the medium.

Carrier-sense multiple access (CSMA) alone allows messages to collide. Under a CSMA scheme, all nodes must defer transmission on the medium until the bus channel clears before any one tries to send their messages. On such an event, multiple nodes might attempt to transmit simultaneously; hence one has a high collision rate. To overcome this problem, Collision Detection (CD) is added which requires nodes to wait for varying delay times before retransmitting. However, under many traffic conditions, CSMA/CD incurs higher message collision levels, longer access time delays and reduced throughputs as maximum node-to-node distance increases. It does not suit real time needs because access to the channel is statistical in nature and in addition no priority mechanism exists. Under CSMA/CD, line access is statistical in lieu of deterministic. Moreover, transmission line length must be limited for a given data rate and data size unit if collision detection is to work.

For a token access system, only the node that holds the token at any time can transmit on the network; hence no access control conflict can arise. In the bus networks, the token goes from node-to-node in predetermined fashion, causing this technique to be deterministic and predictable, and not as constrained by transmission line length, frame size or data rate. However, token access has complex algorithms required to set up the station linkages and to recover from network exception conditions (e.g. recovery from failed nodes, recovery from errors) not to mention its complex control methodology.

The master/slave bus control technique, as it is widely known, has an inherent disadvantage in that if the master becomes inoperative for any reason the control of the bus and hence the exchange of all information ceases and thus the connecting bus becomes inactive.

Various attempts to overcome this disadvantage have been proposed in the prior art, some of which however have replaced the efficient central bus control of the true master/slave with some form of less efficient decentralized bus control.

U.S. Pat. No. 4,255,741 contains a scheme for use in loop type data communications systems which is susceptible to a single point failure which can bring the entire system down, if the central controller fails. In U.S. Pat. No. 4,199,661, the invention's primary object is to provide comparison means to each station for the provision of a time slot signal to permit each station to seize use of the channel. All the subscribers need the same polling and comparison circuitry, increasing complexity and costs. In addition, the lack of a central controller makes dynamic alterations in the physical structure complex.

U.S. Pat. No. 4,177,450 requires the unit with the lowest time constant to take control of the bus during each initialization cycle. Therefore, in-time between transmissions on the bus is a function of the unit in control of the bus, or stated in other words, the in-time varies with the time constant of the unit in control of the bus. If an initiation message is not received within the unique time interval of the station having the shortest time interval, then that station transmits an initiation message. Clearly the inter-transmission time interval is a function of the terminal with the shortest interval timer and therefore the utilization of the connecting bus decreases as a terminal with a longer interval timer seizes control of the bus. Hence, the '450 invention is inefficient in comparison to the invention claimed herein, wherein the station which is in control remains in control, and the time interval between transmissions is constant and independent from any channel contention means.

SUMMARY OF THE INVENTION

As will become clear hereinafter, the multiple master controller succession system for bus access eliminates the network single failure vulnerability of the central controlled bus, while maintaining the orderly, deterministic bus access provided by a central master controller. The multiple master controller bus access procedure enables the automatic and orderly succession of master controllers in the event of failure of the prior master/slave controller.

It is an object of this invention to permit a plurality of master stations to be attached to the connecting channel and to provide an arbitrating mechanism within each master by which one master station is designated as in control of the communication channel.

A further object is to allow the designated master to remain in control until it becomes inoperative, in which case one of the remaining master stations is designated as in active control of the communications channel.

Another object of the invention is to overcome the single point failure of the true master/slave system by providing redundant masters.

Yet another object is to maintain the bus control characteristics of a true master/slave system in which each subscriber or station attached to the bus is polled by a grant transmission at a constant interval of time irrespective of which master is in control of the bus to assure efficient utilization of the bus.

Finally, another object of the invention is to provide a more economical means of implementing communications channel control by not having to equip each slave station with the function of the master station.

These and other features of the present invention will be more readily understood from a consideration of the following description taken in connection with the accompanying drawings.

DESCRIPTION OF THE PREFERRED EMBODIMENTS

Figure 1:
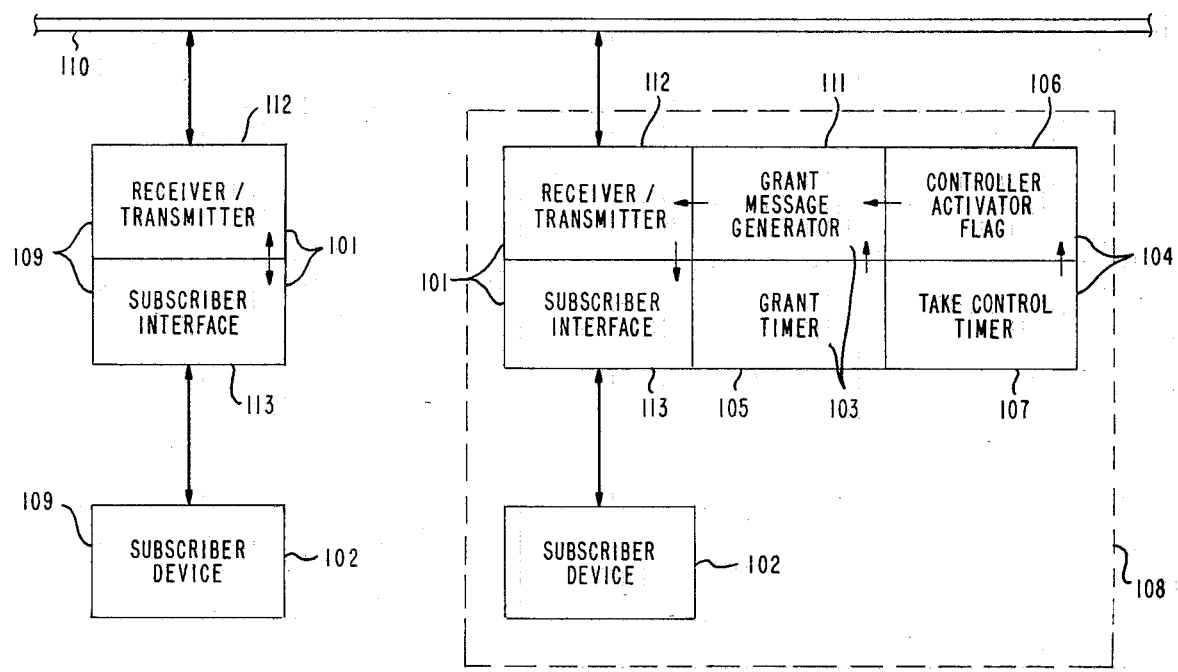
FIG. 1 is a block diagram of the bus network wherein a number of subscribers, interface modules, and other devices are connected to form slave stations and wherein a master station is part of the network.

FIG. 1 depicts the topology of a communications bus network wherein a common bus 110 serves as a communications channel for a variety of multiple subscibers 102.

The invention is embodied by a plurality of slave stations 109 and a plurality of master stations 108 all of which are connected to a common information channel 110. This common information channel or bus 110 provides for the transfer of information between the various subscribers 102. Each slave station 109 consists of a slave module 101 and a subscriber device 102. In practice, the subscriber device 102 is a source and/or sink of information(e.g. a computer, a terminal, a peripheral, a data acquisition device, an activator, etc. ). The slave module 101 functions as an interface between the subcriber device 102 and the common information channel 110. The slave module 101 must hold any information for transmission in obeyance until it is granted the opportunity to transmit over the common information channel 110 by a master station 108. Consequently, a slave module 101 includes a receiver-transmitter 112 and a subscriber interface 113. Each subscriber interface 113 includes detection means for enabling the detection at each subscriber station 102 of information which flows and is received through the common information channel 110.

Each master station 108 includes the modules necessary for it to have the same functional capabilities of a slave station 109. In addition, each master station 108, among its elements has a Take Control Timer 107 which begins timing from a common reference point to a first time schedule, which is unique to each master station 108 when any transmission ends and the common information channel 110 becomes inactive, and a Controller Activator Flag 106 which is set to a logic "one" when the Take Control Timer 107 reaches a first time schedule. Both the Controller Activator Flag 106 and Take Control Timer 107 are elements of the Bus Controller Activator 104. In addition, the Master Station 108 has a Grant Timer 105 which begins timing from a common reference point to a second time schedule, which is shorter than the shortest first time schedule, when any transmission ends and the common information channel 110 thus becomes inactive; and means to generate and transmit 111,112 a grant message which gives the addressed station 108, 109 in the grant message the opportunity to transmit an information message only when the Grant Timer 105 has reached the second time schedule and the Controller Activator Flag 106 is set to logic "one". The Grant Message Generator 111 and the Grant Timer 105 are elements of the Bus Controller 103.

The Take Control Timer 107 and the Grant Timer 105 of each master station 108 are set to and remain at a common reference point each time and for the duration of any transmission over the common information channel 110.

The master station 108 with the shortest first time schedule will therefore have its Controller Activator Flag 106 set to a logic "one" and thus transmit the first grant message and assume the control of the information flow over the common information channel 110.

How the various elements of the invention relate to one another to form an operating system is described by the use of two cases below.

Case I. Power Initiation

Upon application of power, the Take Control Timer 107 and the Grant Timer 105 of each master station 108 are set to a common reference point, and the Controller Activator Flag 106 of each master station 108 is set to a logic "zero". Because of the above initialization, no transmissions of any kind can occur over the common information channel 110. Immediately after initializing, the Take Control and the Grant Timers 107,105 respectively of each master station 108 begin timing to their respective time schedules. Because the second time schedule of each master station 108 is shorter than the shortest first time schedule of any master station 108, all the said Grant Timers 105 reach their second time schedules; however no grant message can be transmitted. The reason is because the Controller Activator Flag 106 of all the master stations 108 have been set to a logic "zero". As there is still no transmission activity, the Take Control Timers 107 continue to time to their respective first time schedules. Since each first time schedule is unique, there will be one master station 108 which will have a shortest first time schedule and thus reach its first time schedule before any other master station 108. This master station 108 will then set its Controller Activator Flag 106 to a logic "one", designating itself as the "active" master station 108 in control of the information flow over the common information channel 110.

Because the Grant Timers 105 of all the master stations 108 have reached their second time schedules, the setting of the Controller Activator Flag 106 to a logic "one" will result in the generation by that master station 108 of the first grant message 111. Because of the transmission of the first grant message and the ensuing common information channel 110 activity, the Take Control and Grant Timers 107, 105 respectively of all the master stations 108 are set to a common reference point.

If the station 108, 109 addressed in the grant message makes a transmission, the ensuing common information channel 110 activity again sets the Take Control and Grant Timers 107,105 respectively of all the master stations 108 to a common reference point.

If the station 108,109 addressed in the grant message fails to transmit, the Take Control and Grant Timers 107, 105 continue to time to their respective time schedules. As described before, because the second time schedules are shorter than the shortest first time schedule, the Grant Timers 105 of each master station 108 reach their second time schedules. This time, however, the Controller Activator Flag 106 of the "active" master station 108 is still set to a logic "one" and will remain so set. Therefore the "active" master station 108, transmits a second grant message to another station 108, 109 in turn according to a prescribed schedule of station addresses.

This process of grant message transmissions continues to each station 108,109 in turn until the "active" master 108 becomes inoperative due to loss of power or circuitry malfunction.

From the above description of Case I, it should be obvious to one skilled in the art that the interval between grant message transmissions is fixed and common to all master stations 108 as well as being independent from the timing mechanism which initially designated one of the master stations 108 as the "active" master station 108.

Case II. Failure of the Active Master Station

Should the "active" master station 108 become inoperative, that is discontinue transmitting grant messages, all transmissions cease and the common information channel 110 becomes inoperative.

As mentioned previously, during periods of common information channel 110 inactivity the Take Control and Grant Timers 107,105 respectively of all the remaining master stations 108 continue timing toward their respective time schedules. As during Case I, the Grant Timers 105 of each remaining master station 108 reach their respective second time schedule. However, since the Controller Activator Flags 106 of the remaining master stations 108 are set to a logic "zero" (condition initialized on power-up), no grant message may be transmitted, and the Take Control Timers 107 continue to time to their respective first time schedules. Being that each first time schedule is unique, there will be one remaining master station 108 with a shortest first time schedule. This station 108 will, therefore, reach its first time schedule before any other master station 108, and therefore will set its Controller Activator Flag 106 to a logic "one" designating itself as the new "active" master station 108. Being that the Grant Timers 105 of all the remaining master stations 108 have reached their respective second time schedules and that one master station 108 has set its Controller Activator Flag 106 to a logic "one", that master station 108 will transmit a grant message to a station 108,109 according to a prescribed address schedule stored in that master station 108. This action continues the control of the information flow over the common information channel 110, thus eliminating the single point failure problem inherent in the known master/slave systems.

Figure 2:
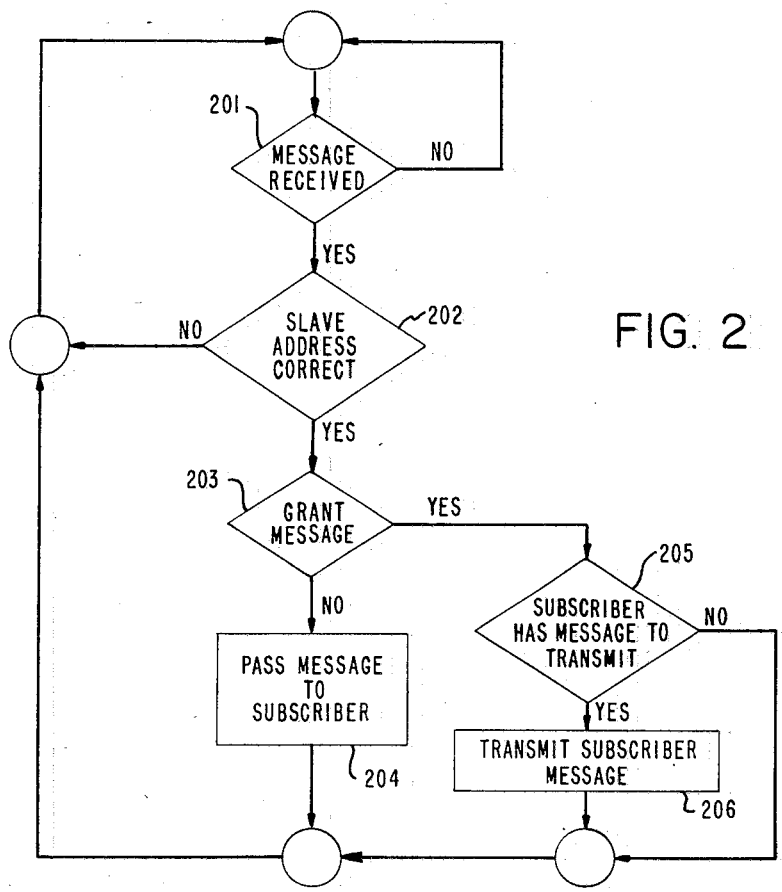
FIG. 2 is a flow diagram of the logic of how a receive message is handled for use by a slave station or a master station to determine whether it is for reception or to grant it approval to transmit.

A more specific description of the slave station 109 functions with its slave module 101 at FIG. 1 is best described by the subroutine of FIG. 2, wherein a flow chart is illustrated which can be specifically implemented in any general purpose device by those skilled in the art.

The subroutine is called and started by the process of determining whether a message has been received 201. If a message is received, the next step in sequence is a branching step 202 which determines whether the slave station 109 address within the received message is correct. If it is correct, the next step is a conditional branching step 203 to determine if the message received is a grant message which alerts the slave station 109 of the existence of time allocated to use the bus 110. If the received message is determined not to be a grant message, the next logic 204 is to pass the received message to the subscriber. However, if the received message is determined to be a grant message, the next step would be to the conditional branching 205 to determine whether the subscriber had a message to transmit. If the logic was in the affirmative, then the logic to transmit the subscriber message held in the Subscriber Device 102 or the Subscriber Interface 113 would take over. The start of transmission 206 of the subscriber message would have to take place within a prescribed fixed time period common to all stations 108,109.

Figure 3:
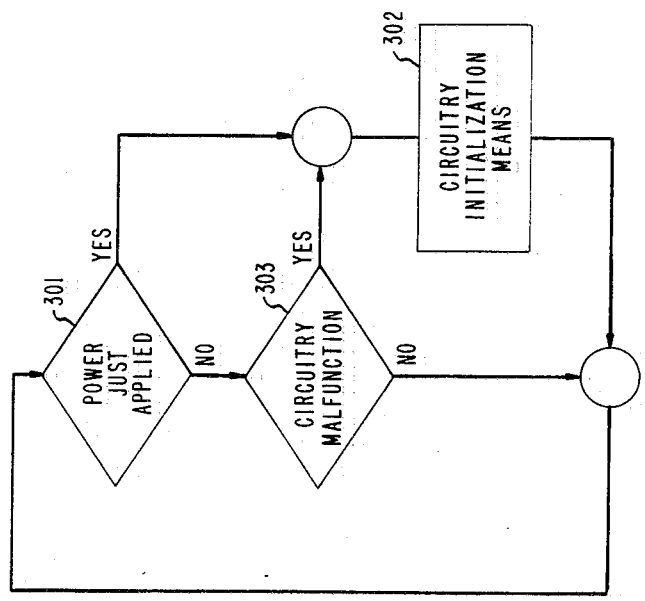
FIG. 3 is a flow diagram of the power-up and circuitry malfunction logic for the initialization found in a master station.

FIG. 3 is a flow diagram of the power-up and circuitry malfunction logic which is continually active and sets the stage for the selection of one of the master stations 108 to be the controller of the network. The first step in the logic sequence is the conditional step 301 of determining whether power had just been applied. If the power had been applied, then the circuitry initialization means 302 are exercised which include clearing of the Controller Activator Flag 106; clearing the Grant Timer Flag contained within the Grant Timer 105; the initialization of the Grant Timer 105; and the initialization of the Take Control Timer 107. This logic occurs continuously as long as power is applied. If a circuitry malfunction occurs 303, then again the circuitry initialization means 302 is also exercised.

Figure 4:
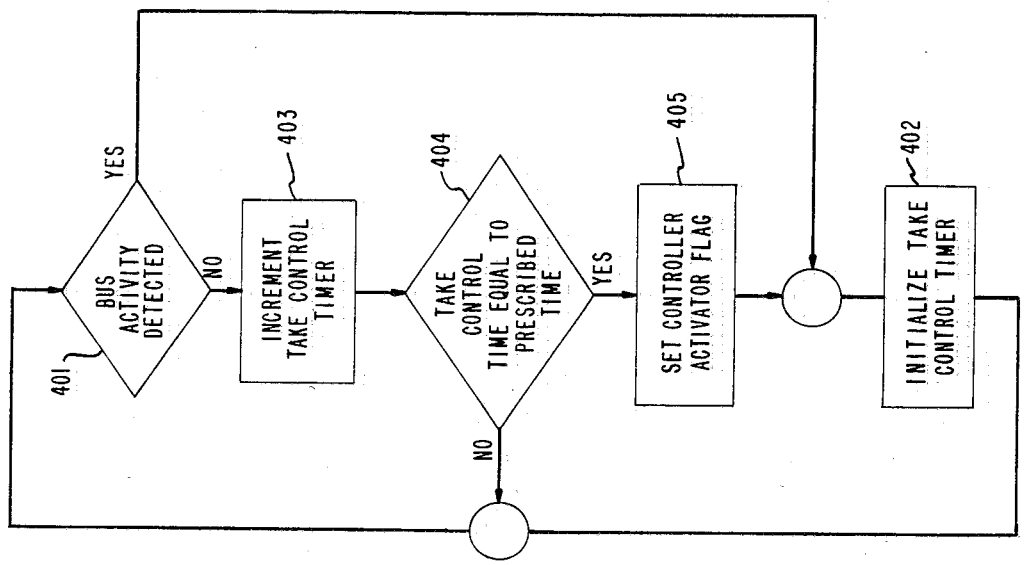
FIG. 4 is a flow diagram of the preferred embodiment of the bus control activator function with controller activator flag set function.

The flow diagram at FIG. 4 describes the preferred embodiment of the Bus Controller Activator 104 function of the master station 108. The sequence commences with the conditional branching step 401 to determine the presence of bus 110 activity. If activity is present, a signal is sent to initialize the Take Control Timer 402. If no activity is present, then the next step is to increment the Take Control Timer 403 within the Bus Controller Activator 104. The next step is a conditional branching step 404 to determine whether the Take Control Timer 107 is equal to the prescribed time. The prescribed time is a time increment unique to each master station 108. If the said answer to the logic 404 is in the affirmative, the next step is to set the Controller Activator Flag 405. The next step is to initialize the Take Control Timer 402 of the master station 108.

From the time the Controller Activator Flag is set 405, the Bus Controller 103 is enabled to transmit grant messages 604 at a time schedule shorter than the shortest Take Control Timer 107 time schedule of any master station 108. Therefore, the bus 110 activity detection 401 will always determine bus activity and initialize the Take Control Timer 402 before the Take Control Timer 107 is determined equal to its prescribed time schedule 404; thereby assuring that the Bus Controller 103 thus enabled remains enabled and that no other Bus Controller 103 of any other master station 108 can be enabled.

This process is concurrently proceeding in each master station 108. The Bus Controller Activator 104 with the shortest take control time schedule will set the respective Controller Activator Flag 106, and thus be the first to enable its respective Bus Controller 103.

Figure 5:
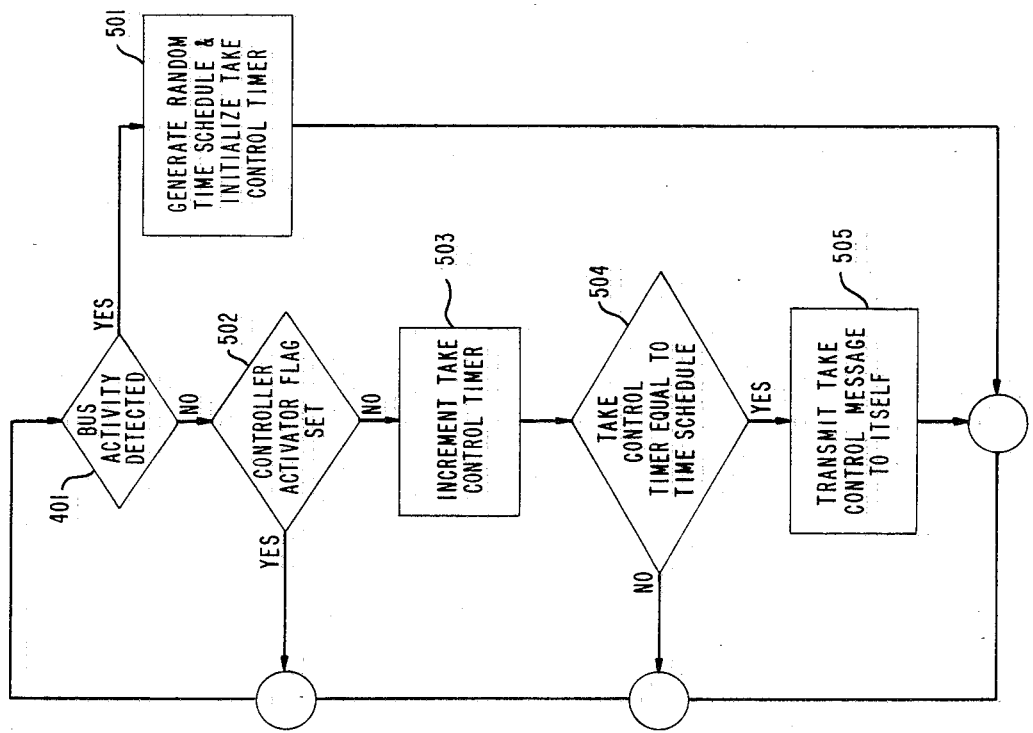
FIG. 5 is a flow diagram of an alternate embodiment of the bus controller activator function.

An alternate embodiment of the Bus Controller Activator 104 function of the master station 108 is depicted by the flow diagram at FIG. 5 which incorporates a random time schedule 501.

The first step in the flow chart is the conditional branching 401 resulting from a determination as to the presence of bus 110 activity. If bus 110 activity is detected, the next step 501 is to generate a random time schedule and initialize the Take Control Timer 107. If no bus activity is detected 401, then the next step is conditional branching 502 to determine if the Controller Activator Flag is set. If it is not set, then the next step is to increment the Take Control Timer 503. The next step in the logic is the conditional branching 504 based on whether the Take Control Timer 107 time is equal to the time schedule, wherein the time schedule is randomly generated 501. If said time is equal to the time schedule, then the next sequence 505 is to transmit the take control message to itself and to the other master stations 108.

If other master stations 108 transmit a take control massage 505 at the same time, messages will be garbled. Consequently, bus 110 activity will result in a new random time schedule and the process will repeat until only one master station 108 transmits 505 and receives 506, 507 its own take control message.

Figure 6:
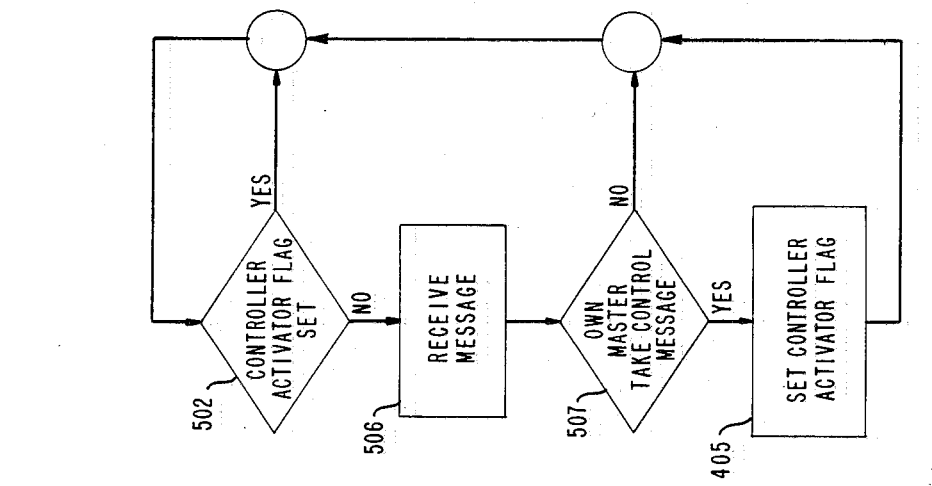
FIG. 6 is the flow diagram of how the controller activator flag is set in the alternate embodiment.

The logic in the flow chart at FIG. 6 reflects that once one master station 108 has received 506 and detected its own take control message 507, the Controller Activator Flag 106 of that station is set 405; and the Bus Controller 103 of that station 108 is thus enabled.

The random time schedules generated 501 in all master stations 108 are of an interval longer than the time schedule of the Grant Timer 702; therefore when one master station 108 is enabled, the ensuing message transmissions on the connecting channel 110 will be of a frequency sufficient to continually reinitialize the Take Control Timer 501 before the Take Control Timer 107 can be incremented to attain the random time schedule generated 503, 504. Therefore the Bus Controller 103, thus enabled, remains enabled and no other Bus Controller 103 of any master station 108 can be enabled.

Figure 7:
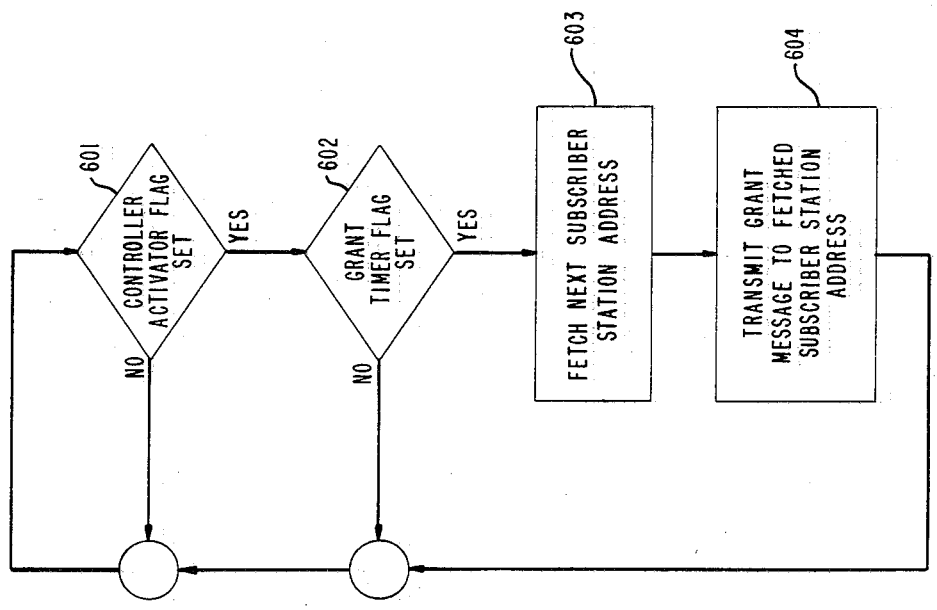
FIG. 7 is a flow diagram of the bus controller function of the master station.

FIG. 7 depicts the operation of the Bus Controller 103 at FIG. 1 through the use of a flow logic diagram. The main function of the Bus Controller 103 is to allow access to the bus 110 to the various subscribers 102 by the generation and transmission of grant messages. The Bus Controller 103 is under the supervision of the Bus Controller Activator 104 for activation purposes.

The first step in the sequence, so that the master station 108 is made ready to assume the possible status as active master 108, is a conditional branching step 601 to the logic which detects and determines if the Controller Activator Flag 106 is set. The bus control function is disabled as long as the Controller Activator Flag 107 in the Bus Controller Activator 104 is not set. With an affirmative answer, the next step in the logic is the conditional branching 602 to determine whether the Grant Timer Flag is set. Once the Grant Timer Flag is set, the logic 603 to fetch the next subscriber station 102 address can come from a sequentially incremented address counter or a fetch from a table of pre-stored numbers. The next sequence is the logic 604 to transmit the grant message to the fetched subscriber station address.

Figure 8:
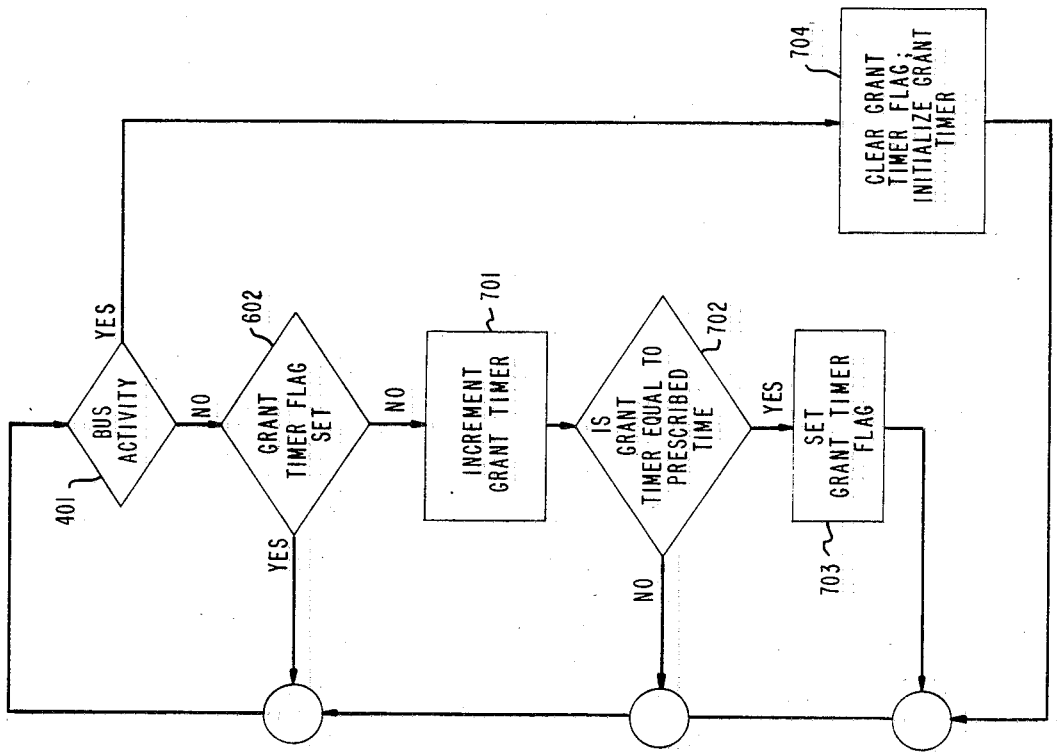
FIG. 8 is a flow diagram of the bus controller function of the master station with respect to clearing and initializing the Grant Timer.

The flow chart at FIG. 8 depicts the logic 703 for setting the Grant Timer Flag to include the logic 704 for clearing and the initialization of the Grant Timer 105.

The detection of bus 110 activity is a conditional step to the clearing of the Grant Message Flag and initialization of the Grant Message Timer 704.

In the absence of bus 110 activity, the next conditional logic 602 is to determine whether the Grant Timer Flag is set. If the Grant Timer Flag 105 is not set, then the Grant Timer 105 is incremented 701.

Thereafter a conditional logic 702 is exercised to determine whether the Grant Timer 105 time is equal to the prescribed time. If the logic reply is in the affirmative, then the Grant Timer Flag is set 703.

The setting of the Grant Timer Flag 703 enables the Bus Controller 103 to transmit a Grant Message to a selected station attached to the Bus 110. The ensuing bus activity reinitializes the Grant Timer 105 and clears the Grant Timer Flag 704. The station 102 addressed by the Grant Message had until the issuance of another Grant Message to transmit.

It will be readily apparent to those skilled in the art that the invention is not in any way limited to the illustrative examples and flow charts, which have been presented and it is intended that the invention encompass equivalent techniques of the type that have been described, if these are performed and implemented according to the following claims:

What is claimed is:

1. A method for maintaining control of the exchange of information between stations of an information exchange system comprising:

attaching stations or subscribers to a common information channel over which information is exchanged between said stations or subscribers;

connecting a plurality of slave stations attached to said connecting channel, each of said slave stations including means to transmit and receive information over said connecting channel;

connecting a plurality of master stations attached to said connecting channel, each of said master stations:

transmitting and receiving information on said connecting channel;

providing control means to actualize the exchange of information between all stations attached to said connecting channel, including means to become disabled on initial application of power or detection of circuitry malfunction; and providing control activation means to make active a master station by enabling said control means according to a prescribed schedule including an active control detection means to determine a condition when no said master station is in active control of the information exchange over said connecting channel.

2. A method, as recited in claim 1, wherein said control means is affected by selective transmission, over said connecting channel, to each station in turn, according to a prescribed schedule of a grant message to permit said station addressed to transmit on said connecting channel within a fixed time schedule common to all said stations.

3. A method, as recited in claim 1, wherein the control activation means performs the steps of:

detecting activity on said connecting channel due to a transmission taking place over said connecting channel;

initializing timing means to a common reference point during time intervals of said detected connecting channel activity;

incrementing said timing means for a time interval equal to a time schedule unique to said activated master station, during the time intervals in which no said connecting channel activity is detected, said unique time schedule being independent from and greater than the time interval between transmissions over said connecting channel during normal operation; and activating said control means when said timing means is incremented for a time interval equal to said unique time schedule.

4. A method, as defined in claim 1, wherein the control activation means comprise the steps of:

detecting said connecting channel activity due to a transmission taking place over said connecting channel;

generating a time schedule at the end of each time interval of said detected connecting channel activity;

initializing said timing means to a common reference point during the time intervals of said detected connecting channel activity;

incrementing said timing means for a time interval equal to said random time schedule during the time intervals in which no said connecting channel activity is detected;

transmitting a unique message over said connecting channel, by said master station to itself, when the said timing means is incremented for a time interval equal to said random time schedule;

detecting said unique message by said master station which transmitted said unique message; and activating said control means to actualize the exchange of information between all stations after said detection of the said unique message.

5. An apparatus for maintaining the control of the exchange of information between stations of an information exchange system comprising:

a connecting channel over which information is exchanged between the attached stations or subscribers;

a plurality of slave stations attached to said connecting channel, each of said slave stations including means to transmit and receive information over said connecting channel;

a plurality of master stations attached to said connecting channel, each of said master stations including, means to transmit and receive information on said connecting channel;

control means to actualize the exchange of information between all stations attached to said connecting channel, including means to become disabled on initial application of power or detection of circuitry malfunction; and control activation means to make active a master station by enabling said control means according to a prescribed schedule including an active control detection means to determine a condition when no said master station is in active control of the exchange of information over said connecting channel.

6. An apparatus, as recited in claim 5, wherein said control means comprises logic for generation of a grant message which is transmitted over said connecting channel, to each station in turn, according to a prescribed schedule, to permit said station addressed to transmit on said connecting channel within a fixed time schedule common to all said stations.

7. An apparatus, as recited in claim 5, wherein the control activation means in each master station includes:

a channel activity detection means to determine the condition when said connecting channel is active due to a transmission taking place over said connecting channel;

a timing means, which includes, initialization means to set said timing means to a common reference point during time intervals that said channel activity detector means determines connecting channel activity;

means to increment said timing means for a time interval equal to a time schedule unique to said master station, whose shortest time schedule is greater than and independent of the time interval between transmissions over said connecting channel; and an activation means to enable said control means when said timing means is incremented for a time interval equal to said unique time schedule.

8. An apparatus, as recited in claim 5, wherein the control activation means in each master station includes:

a channel activity detection means to determine if said connecting channel is active due to a transmission taking place over said connecting channel;

a random timing means to generate a random time schedule;

a unique message transmission means to transmit a message unique to said master station over said connecting channel where said unique message transmission means is disabled when said channel activity detection means determines that said connecting channel is active or where said control means is enabled or where said random timing means has not been incremented for a time interval equal to its random time schedule; and a unique message detection means for the detection of unique message of said master station including means to enable said control means upon detection of said unique message.

9. An apparatus, as recited in claim 8, wherein the random timing means comprises:

means to generate a time schedule at the end of each time interval created by said channel activity detection means when activity is determined on said connection channel;

means to increment said random timing means for a time interval equal to said random time schedule commencing at the end of each time interval created by said channel activity detection means when activity is determined in said connecting channel;

means to initialize said random timing means to a common reference during time intervals said channel activity detection means determines connecting channel activity.

* * * * *